No. 706,416. Patented Aug. 5, 1902.
H. G. HOTCHKISS.
BEET HARVESTER.
(Application filed Sept. 3, 1901.)
(No Model.) 2 Sheets—Sheet 1.
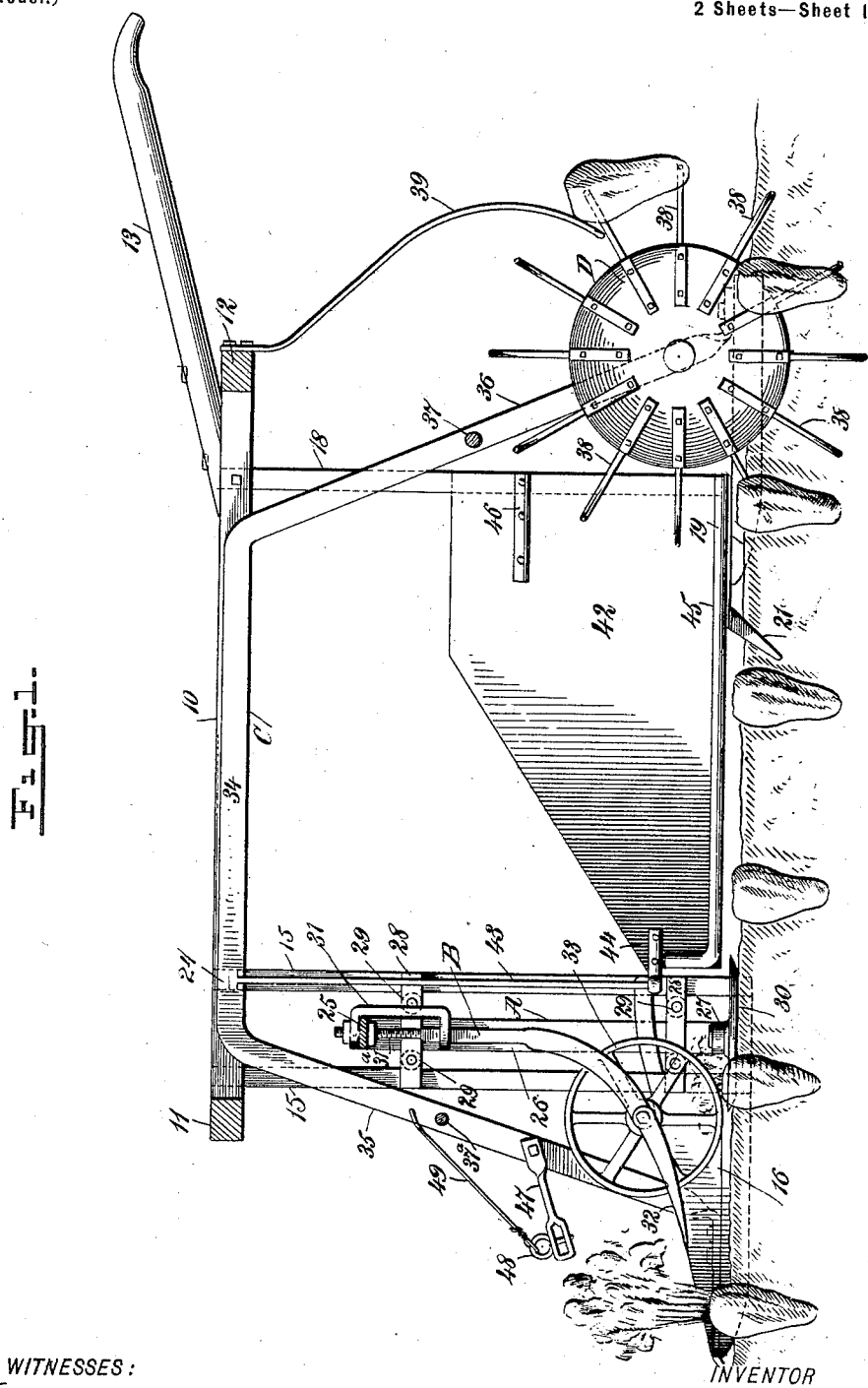
WITNESSES:
INVENTOR
Hiram G. Hotchkiss
BY
ATTORNEYS

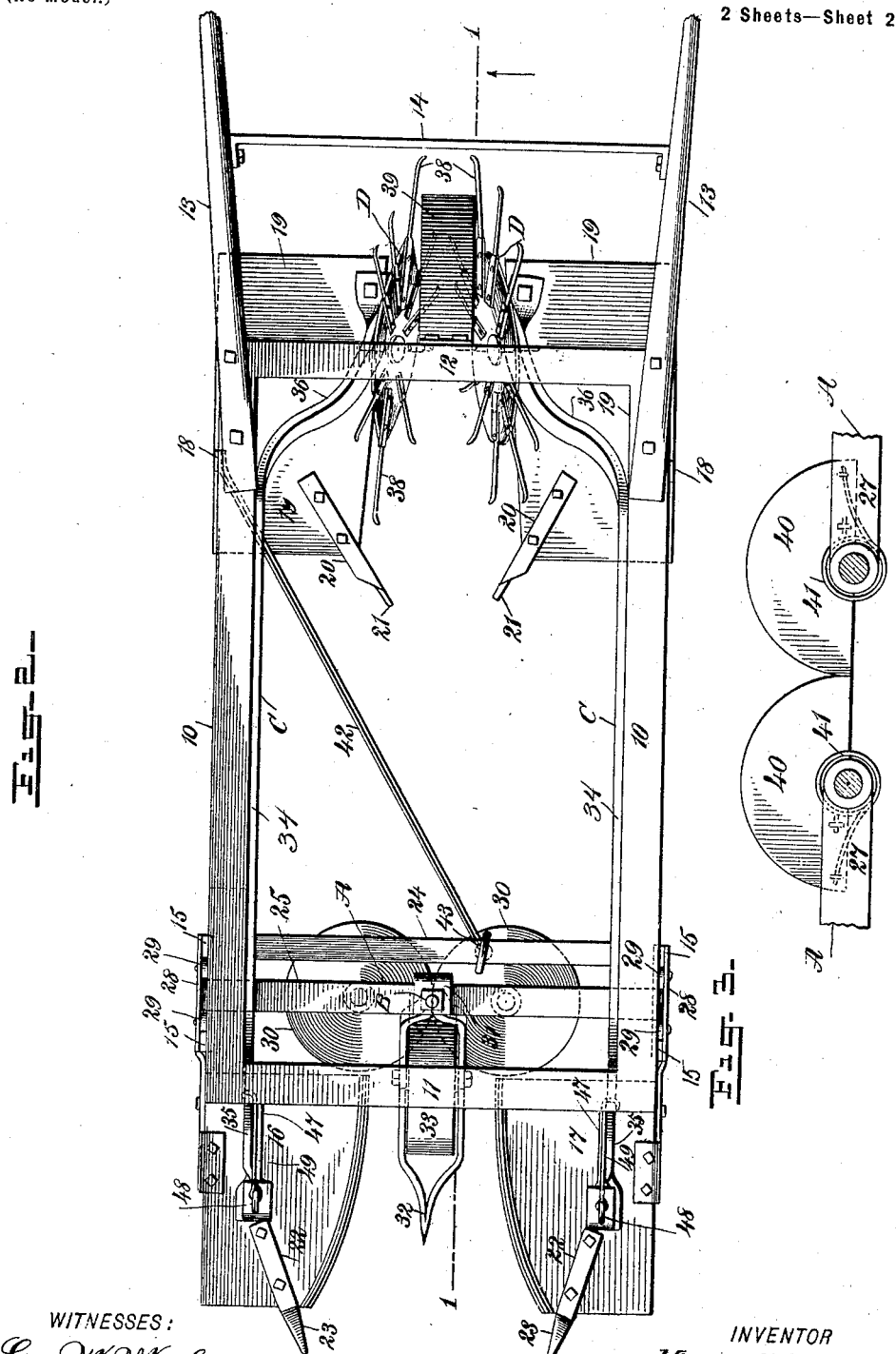

UNITED STATES PATENT OFFICE.

HIRAM GILBERT HOTCHKISS, OF LYONS, NEW YORK.

BEET-HARVESTER.

SPECIFICATION forming part of Letters Patent No. 706,416, dated August 5, 1902.

Application filed September 3, 1901. Serial No. 74,099. (No model.)

*To all whom it may concern:*

Be it known that I, HIRAM GILBERT HOTCHKISS, a citizen of the United States, and a resident of Lyons, in the county of Wayne and State of New York, have invented a new and Improved Beet-Harvester, of which the following is a full, clear, and exact description.

This invention relates particularly to implements or machines adapted for harvesting sugar-beets; and the purpose of the invention is to provide a machine with a guide-wheel adapted to travel over the crowns of the beets and to fit the wheel with a supporting arm or finger which will prevent any of the leaves or stems getting under the wheel, enabling cutters at the rear of the wheel to make a clean cut of the tops at the crown of the beets, and to so construct the cutters that they will cut beets even when planted close together and will make no skips under such conditions.

Another purpose of the invention is to support the frame of the machine on runners at the front and at the rear and to provide such runners with fingers adapted to enter the ground and loosen the same around the beets, enabling gatherers at the rear of the machine to easily and cleanly remove the beets from the ground as the machine advances, and also to provide a device at the rear of the machine which will automatically remove the beets from the gatherers.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section taken on the line 1 1 of Fig. 2. Fig. 2 is a plan view of the machine; and Fig. 3 is a detail sectional view through a portion of the frame, illustrating the preferred shape of the cutters to be used when the beets are planted close together.

The upper structure of the frame of the machine is shown rectangular, comprising two side beams 10, a front cross-beam 11, and a rear cross-beam 12. Handles 13 are secured to the rear portion of this upper structure of the frame, the handles being braced by one or more bars 14. Uprights 15, usually two in number, extend from the side beams 10 near the front downward and are secured in any approved manner to front runners 16 and 17, which project forward beyond the frame of the machine. The inner edges of these runners are curved more or less from their rear ends outward and forward, as is shown in Fig. 2, the space between the runners being that in which the beet-tops to be cut are received. Uprights 18 also extend down from the side beams of the upper structure near the rear, and these standards or uprights 18 are secured to rear runners 19, a space between the said runners practically corresponding to the space between the forward runners 16 and 17.

The shanks 20 of fingers 21 are diagonally secured to the upper face of the rear runners 19, the shanks extending beyond the inner forward corners of the runners 19 and the fingers 21 extending downward at an angle to their shanks, so that the said fingers will enter the ground and will loosen the soil adjacent to the beets, enabling the beets to be readily drawn out from the soil. Similar fingers 23 are similarly located at the forward ends of the forward runners 16 and 17 through the medium of shanks 22, and these forward fingers 23 assist the rear fingers 21 in the loosening of the soil. The upper structure is usually braced by a transverse bar 24, located at the front, and at the forward portion of the frame a yoke A is located, which consists of a top bar 25, extending out between the forward uprights 15, as is shown in Fig. 2, the said top bar or member 25 of the yoke being at a point below the upper portion of the frame, and in the completion of this yoke downwardly-extending side members 26 are employed, which side members are returned inward or in direction of each other in a horizontal plane, forming feet 27, as shown in Figs. 1 and 3. This yoke A is not attached to the frame, but is free to move up and down and is guided in such movement by transverse plates 28, secured to the uprights or standards 15. These transverse plates 28 are provided with friction-rollers 29, as shown in Figs. 1 and 2, engaging with the side edges of the side members of the said yoke A.

The hub portions of disk cutters 30 are pivoted to the foot members 27 of the yoke A, and these disk cutters 30 are so arranged that their peripheral edges practically meet at a point represented by a longitudinal line drawn centrally through the bottom portion of the machine, as is shown in Fig. 2. Under this arrangement the disk cutters 30, which are adapted to jointly cut the tops from the beets at the crowns thereof, may move up and down, and thus accommodate themselves to inequalities of the ground.

A small yoke 31 is carried at the central portion of the main yoke A, and the upper threaded portion 31ª of a shank B is adjustably passed through the upper member of the main yoke A and upper member of the auxiliary yoke 31. The adjustment of the said shank is controlled through the medium of suitable nuts, as shown in Fig. 1. The plain straight portion of the shank extends loosely down through the lower member of the auxiliary yoke 31, as is also shown in Fig. 1, and the lower portion of the shank B is curved downward and forward. The said curved portion of the shank is in two members, and between these members a guide-wheel 33 is mounted to turn, the said wheel being adapted to travel over the crown portions of the beets whose tops are to be cut, and the wheel is therefore located at a point over the forward meeting peripheral points of the disk cutters 30, as is shown in Fig. 2. The members of the straight portion of the shank are brought together in front of the guide-wheel 33, forming a finger 32, which finger as the machine advances passes over the leaves and stalks in advance of the wheel, separating the leaves and stalks, thus permitting the guide-wheel to pass over the crown of a beet without pressing down any of the leaves or stems and enabling the cutters to cleanly remove the tops from the beets.

In addition to the main frame which has been described an auxiliary frame C is employed. This auxiliary frame, as is shown in Figs. 1 and 2, consists of upper horizontal bars 34, one adjacent to each of the upper side bars 10 of the main frame, and these upper bars 34 of the auxiliary frame are usually connected by the front cross-bar 24. A front bar 35 is carried downward from the front end of each of the upper horizontal bars 34, and the front bars 35 are secured in any suitable or approved manner to the front runners 16 and 17, as is shown in Fig. 2, the attachment being preferably made at a point nearer the outer sides of the runners than the inner sides. Corresponding rear bars 36 are carried downward and rearward from the upper horizontal bars 34 of the auxiliary frame C; but these rear bars 36 are made to converge at their lower ends to a greater or less extent and the space between them may be more or less curved or inclined, as is illustrated in Fig. 2. The rear bars 36 of the auxiliary frame C are secured to the rear runners 19 near the inner side edge of their rear ends.

The front and rear bars or members of the auxiliary frame C may be and preferably are braced by horizontal rods, (designated, respectively, as 37ª and 37,) as is shown in Fig. 1.

Between the rear bars 36 of the auxiliary frame C two gathering-disks D are mounted to revolve, being pivotally attached to the inner faces of the said rear bars or members 36, as is best shown in Fig. 2, and each gathering-disk D is given a downward and inward inclination to a greater or less extent, so that the lower peripheral portions of the two gathering-disks are closer together than their upper peripheral portions. Each gathering-disk is provided with a series of fingers 38. These fingers are secured to the inner faces of the disks in any suitable or approved manner—by bolts, for example—and said fingers extend as far as may be desirable beyond the peripheries of the disk, having their outer ends curved more or less inward, as is shown in Fig. 2.

As the machine advances the finger 32 separates the tops of the beets over which the guide-wheel 33 is to pass, so that none of the tops will be pressed down by said wheel, and the wheel will travel over the crowns of the beets, which are planted in rows. Cutters 30, following the guide-wheel, sever the tops from the crown portions of the beets in an expeditious and cleanly manner, and prior to the action of the cutters and after said action the forward and rear fingers 23 and 21, respectively, act to loosen the earth around the beets, so that when the beets are reached by the gathering-disks, the disks being at each side of the row as the fingers 38 of the gathering-disks engage with the beets, as is shown in Fig. 1, the beets are carried out from the ground and are discharged from the fingers of the gathering-disks at the rear of the machine through the medium of a stripper 39, which is in the form of a curved spring strip or plate attached to the central rear portion of the upper structure of the main frame and extending downward with a downward and inward curvature, as is shown in Figs. 1 and 2, to a point between the fingers 38 of the gathering-disks D as the said fingers ascend.

Usually the cutters are in the form of circular disks 30, (shown in Figs. 1 and 2;) but where the beets are planted in rows close together or the beets in a row are close together the cutters are preferably made as shown in Fig. 3, in which the cutters 40 are of semicircular form. These cutters 40 are mounted to turn in the foot sections or members 27 of the yoke A in the same manner as are the disk cutters 30, and normally the segmental or semicircular cutters 40 are held with their inner peripheral edges in contact and their curved edges facing outward, as shown in Fig. 3, by means of springs 41, which springs are coiled around the hubs of the cutters and are attached at one end to said hubs, the other ends of the springs being secured in any approved manner to the foot members 27 of the said yoke A, as is shown in Fig. 3, so that in operation just as soon as the cutters have made a cut and removed the top from one beet, during which action they will have been carried rearward and inward or in direction of each other, the cutters will be immediately carried to their clipping position again by the springs 41, causing the next beet-top, no matter how close the beet may be to the one first topped, to be cleanly severed.

In order to automatically carry off the tops of the beets to one side of the machine—for example, the right-hand side—I employ a diagonal fender 42, which fender is supported at its forward end by means of an attached arm 44 and an upright shaft 43, the said shaft extending up through the cross-bar 24, as is shown in Fig. 2, while the outer end of the fender is attached by an arm 46 or otherwise to the right-hand rear upright 18 of the frame. The fender 42 is stiffened at its bottom usually by means of an attached rod 45, circular or semicircular in cross-section.

Draft-clevises 47 are pivotally attached to the forward members 35 of the auxiliary frame C, and these draft-clevises terminate at their forward ends in an eye, through which eyes pins 48 are passed, so as to secure the singletrees therein, and these pins are attached by wires 49, cords, or otherwise to the said forward members of the auxiliary frame, so that the pins 48 are not likely to be lost and are always at hand.

Having thus described my invention, I claim as new and desire to secure by Letters Patent—

1. In a beet-harvester, a frame adapted to travel over the surface of the ground, a guide carried by the frame, adapted to travel over the crowns of the beets, a top-separating finger carried by the support for the said guide and in advance of the said guide, and cutters mounted to rotate at the rear of said guide, said cutters being in pairs, the edges of the cutters in a pair being brought close together at a point at the rear of the said finger of the guide, substantially as described.

2. In a beet-harvester, a frame adapted to travel over the surface of the ground, a guide carried by the frame, adapted to travel over the crowns of the beets, a top-separating finger carried by the support for the said guide and in advance of the guide, cutters mounted to rotate at the rear of said guide, said cutters being in pairs, the edges of the cutters in a pair being brought close together at a point at the rear of the said finger of the guide, a yoke-frame carrying the said cutters, which yoke-frame has vertical guided movement in the main frame of the machine, and fingers carried by the main frame, which fingers enter the ground at opposite sides of the beets to be topped, for the purpose of loosening the soil around the topped beets, as described.

3. In a beet-harvester, the combination, with a main frame, a yoke located at the forward portion of the main frame, having vertical guided movement in said main frame, cutters mounted to turn at the bottom portion of the said yoke, which cutters have their peripheral edges brought close together at a point represented by a line drawn transversely through the cutters and frames, a shank adjustably carried by the said yoke, a guide-wheel carried by the said shank, adapted to travel in front of the meeting-point of the cutters, and a gathering device carried by the frame at the rear of the cutters, arranged to draw the beets from the ground, as and for the purpose set forth.

4. In a beet-harvester, the combination with a main frame, of a frame mounted to slide freely on the main frame, horizontally-arranged cutters mounted on the lower end of the sliding frame, a guide-wheel in advance of the cutting edges of the cutters, and a separating-finger in front of the guide-wheel, the wheel and finger being carried by a common support, as set forth.

5. In a beet-harvester, the combination with a main frame, of a frame mounted to slide freely in the main frame, horizontally-arranged disk cutters on the lower end of the sliding frame, a guide-wheel in advance of the cutting edges of the cutters, a separating-finger in front of the guide-wheel, and a support for the wheel and finger adjustably mounted in the sliding frame, as set forth.

6. In a beet-harvester, the combination with a main frame supported by runners at its front and at its rear, a yoke having vertical guided movement at the forward portion of the main frame, cutters mounted to revolve at the bottom portion of the said yoke, the cutters being in pairs, their cutting edges approaching each other closely at the longitudinal center of the frame, a shank adjustably carried by the said yoke, a guide-wheel carried by the said shank in advance of the meeting edge of the cutters, which wheel is adapted to travel over the crown of the beets from which the tops are to be cut, and a separating-finger carried by the shank of the guide-wheel and located in front of the said wheel, which finger is adapted to separate the tops of the beets in advance of the guide-wheel passing over their crowns, as set forth.

7. In a beet-harvester, the combination with a main frame, of a frame mounted to slide loosely in guideways of the main frame, a horizontally-arranged cutter on the lower end of each side member of the said frame, a shank adjustably secured to the frame carrying the cutters and having a curved lower portion, and a guide-wheel mounted in the curved portion of the shank, as set forth.

8. In a beet-harvester, the combination with a main frame, of a frame mounted to slide loosely in guideways of the main frame, horizontally-arranged cutters on the lower ends of the side members of the frame, a shank adjustably secured to the cutter-carrying frame and having a forwardly-curved lower portion, said curved portion being in two members which are brought together to form a finger, and a wheel mounted between the members of the shank, as set forth.

9. A beet-harvester, comprising a main frame mounted on runners, a frame mounted to slide freely in the main frame, horizontally-arranged disk cutters on the lower end of the sliding frame, a guide-wheel in advance of the cutting edges of the cutters, a separating-finger in front of the guide-wheel, a support for the wheel and finger adjustably mounted in the sliding frame, an auxiliary frame secured to the front and rear runners, and a gathering device mounted in the rear portion of the auxiliary frame, as set forth.

In testimony whereof I have signed my name to this specification in the presence of two subscribing witnesses.

HIRAM GILBERT HOTCHKISS.

Witnesses:
WM. S. SCOTT,
W. H. MAPES.